United States Patent [19]
Matsuyama et al.

[11] Patent Number: 5,205,979
[45] Date of Patent: Apr. 27, 1993

[54] AUTOMATIC CONTROLLING DEVICE OF BURNERS OF A SHAFT FURNACE UTILIZING FUZZY LOGIC

[75] Inventors: Hiroyuki Matsuyama, Hyogo; Masaki Ojima, Osaka; Yasutoshi Takemoto, Hyogo; Hirokazu Sugawara, Osaka, all of Japan

[73] Assignee: Sumitomo Electric Industries, Ltd., Osaka, Japan

[21] Appl. No.: 828,233

[22] Filed: Jan. 30, 1992

[51] Int. Cl.$^5$ .............................................. C21B 7/24
[52] U.S. Cl. .................................. 266/80; 266/99; 266/197
[58] Field of Search ...................... 266/80, 78, 99, 197

[56] References Cited
FOREIGN PATENT DOCUMENTS
1-234530 9/1989 Japan.
3-160213 7/1991 Japan.

Primary Examiner—Scott Kastler
Attorney, Agent, or Firm—Cushman, Darby & Cushman

[57] ABSTRACT

A shaft furnace for melting copper solid into copper melt has been controlled by manual operation with reference to the actual storage quantity of the holding furnace so far. The burner air pressure of each zone of the shaft furnace is controlled by the actual storage quantity and the time change of it using Fuzzy Logic. The temperature of copper melt is adopted as another input signal. The proportion of burner air pressure of the zones is revised by the melt temperature. Automatic control basing upon the present invention decreases the fluctuation of storage quantity of the holding furnace.

1 Claim, 7 Drawing Sheets

FIG. 5

| E \ ΔE | N B | N S | Z O | P S | P B |
|---|---|---|---|---|---|
| N B | P B | P B | P B | P M | Z O |
| N S | P B | P M | P S | Z O | N S |
| Z O | P M | P S | Z O | N S | N M |
| P S | P S | Z O | N S | N M | N B |
| P B | Z O | N M | N B | N B | N B |

AUTOMATIC CONTROLLING DEVICE OF BURNERS OF A SHAFT FURNACE UTILIZING FUZZY LOGIC

BACKGROUND OF THE INVENTION

1. Field of the Invention

This invention relates to an automatic controlling device of burners of a shaft furnace utilizing Fuzzy Logic. Conventional controlling method of a shaft furnace controls the burning power as a function of storage quantity of a holding furnace. The storage quantity has been divided into seven steps. The burning power has been prescribed to seven classes according to the seven steps of the actual stock.

2. Description of the Related Art

Conventional controlling system of a shaft furnace will now be explained by FIG. 1 which is a schematic view of this invention. A shaft furnace (1) is a tall cylindrical furnace having an inlet at the top and an outlet at the bottom. Material copper solid is supplied through the inlet into the shaft furnace. Several burners are furnished in the shaft furnace in order to heat and melt the material copper solid. Copper melt is exhausted from the shaft furnace through the outlet. Namely, a shaft furnace is a furnace to melt copper solid into copper melt. The shaft furnace is divided into three zones; zone A (lowest), zone B (middle), and zone C (highest). LNG burners A, B and C are respectively installed in the three zones A, B and C. LNG is liquefied natural gas. These burners use LNG as fuel. Air and LNG are supplied at the same time to the burners. The mixture ratio of LNG to air is always kept to be a most favorable, constant value by a gas supplier of the burners. The burner air pressure is an independent, controlling variable. But the LNG flux is a dependent variable which is determined by the air pressure, because the mixture ratio is kept to be constant. The burning power can be controlled by decreasing or increasing the burner air pressure. The shaft furnace (1) melts copper solid into copper melt by the LNG burners installed in the zones A, B and C.

The copper melt exhausted from the shaft furnace (1) is conveyed into a holding furnace (2). The holding furnace (2) is a cylindrical vessel which can rotate around an central axial line. The cylindrical vessel has an inlet at the center of a rear end wall through which the copper melt flows in the vessel. The cylindrical vessel has an outlet at a non-central spot of a front end wall at through which the copper melt flows out. The front end wall is slightly lower than the rear end wall. When the holding furnace (2) rotates around the central axis, the height of the outlet changes.

The rotation angle $\theta$ of the holding furnace (2) around the central axis is called inclination angle. Copper melt flowing from the outlet will be supplied to the casting process or the press-rolling process.

The height of the outlet of the front end coincides with the height of the copper melt in the cylindrical vessel. Thus, the storage quantity (H) of the copper melt contained in the vessel is uniquely determined by the height of the outlet. The height of the outlet is also determined by the inclination angle $\theta$. Thus, the storage quantity (H) is determined by the inclination angle ($\theta$).

Smaller inclination angle ($\theta$) corresponds to larger storage quantity (H). Larger inclination angle ($\theta$) corresponds to small storage quantity (H). Actual relation between the inclination angle ($\theta$) and the storage quantity (H) depends on the geometric shape of the holding furnace (2). In practice, the relation of the inclination angle ($\theta$) to the storage quantity (H) should be predetermined as a folding-line function. The function is able to be exhibited by the folding-line graph ($\alpha$) in FIG. 1. The graph ($\alpha$) has an abscissa showing the inclination angle $\theta$, and an ordinate showing the storage quantity H.

The storage quantity H is determined from the measured inclination angle $\theta$ by the graph ($\alpha$). This is called conversion of inclination angle/storage quantity.

The flux of the copper melt flowing out of the holding furnace (2) is controlled to be nearly constant. Thus, large storage quantity (H) in the holding furnace (2) signifies large exhaust quantity yield flowing from the shaft furnace (1).

On the contrary, small storage quantity (H) in the holding furnace signifies small quantity of copper melt in the shaft furnace which melts solid material. This may mean insufficiency of the burning power or insufficiency of the supply of material copper solid.

In practice, it is desirable that the storage quantity (H) should be constant. If the storage quantity (H) varied, the quality of copper products which would be made by the later processes might also change. The fluctuation of the storage quantity (H) is likely to induce the fluctuation of the quality of products. Therefore, predetermining a preferable storage quantity (H$_□$) which is called reference storage quantity, an operator compares the actual storage quantity (H) with the reference storage quantity (H$_{SB}$) and controls the air pressure of the burners of the three zones A, B and C so as to have the actual storage quantity (H) access to the reference storage quantity (H$_□$).

Namely, the conventional controlling method has controlled the burning power by taking only the actual storage quantity (H) into account. When the actual storage quantity (H) was smaller, the operator increased the burning power in order to heighten melting of copper and to increase the yield of the copper melt in the shaft furnace. On the contrary, when the actual storage quantity (H) was larger, the operator decreased the burning power in order to suppress melting copper and decrease the yield of the copper melt.

Then, the operator determined a preferable burning power from graph ($\beta$) which prescribed the relation of the storage quantity (H) to the burner air pressure, and controlled the air pressure of the burners. In practice, the storage quantity was divided into seven steps. Seven preferable values of burner air pressure were allotted to each of seven steps of the storage quantity (H). Thus, the relation between the storage quantity (H) and the burner air pressure (Q) was described by a stepwise function having seven steps. Graph ($\beta$) in FIG. 1 shows the stepwise function.

Since this shaft furnace (1) is provided with three burners A, B and C, three values of the burner air pressure must be determined and controlled as functions of the actual storage quantity (H). In this example, the maximum storage quantity in the holding furnace was 15 ton. For example, preferable burner air pressures were settled to be 800 mmAq, 900 mmAq, and 950 mmAq for the burners A, B and C respectively where the storage quantity (H) is 8 ton to 9 ton.

The operator repeated such an adjustment of burner air pressure every sampling time with a certain length. "k" denotes the sampling number "H$_k$", "Q$_k$" and "QA$_k$" signify the storage quantity, inclination angle and air pressure of burner A at the k-th sampling time t$_k$.

The same operation of adjustment repeated every sampling time. The adjusted values QA$_k$, QB$_k$ and QC$_k$ of the air pressure of the burners A, B and C were entirely determined only by the actual storage quantity H$_k$ at the sampling time t$_k$. No other values of H$_n$ at any other sampling times t$_n$ before t$_k$ (h<k) were required for the adjustment of the air pressure QA$_k$, QB$_k$ or QC$_k$. The adjusted values of air pressure of the burners A, B and C were supplied to three controllers (3) and positioners (4). An output signal of the positioner (4) determined the opening degree of valves which controlled the air pressure of the burners. The output signal (7) of the positioner (4) was transmitted by an alternative switch (5) to a motor (6). According to the signal (7) of the positioner (4), the motor (6) rotated clockwise or counterclockwise in order to adjust the opening degree of a valve (8). A blower (9) inhaled and pumped air into the burners A, B and C of the shaft furnace (1). The valve (8) was provided with an air passage from the blower (9) to the burners. A feedback loop was formed to control every valve (8). The rotation angle of the motor (6) was detected as a valve-opening-signal (10) which was fed back to the positioner (4). If any deviation was detected between the actual opening degree and the designated one, the positioner (4) sent a revisional signal to the motor (6). In a short time, the opening degree of the valve (8) was settled at a designated one. In addition to the opening degree of the valve (8), the actual air pressure of the burners was also monitored to revise the output signal of the controller (3). By the action of the feedback loop, the air pressure of the burner coincided with the designated value QA$_k$. Thus the burning power of the zone A was adjusted. Similar adjustment was carried out on the burners B and C of the zones B and C.

The conventional controlling system had some drawbacks. Since the conventional method took account only of the storage quantity in order to control the burning power of the shaft furnace, it could not discern whether the storage quantity was approaching to or receding from the designated (reference) value of storage quantity. The conventional method took no account of the direction of change of the storage quantity. It controlled the burning power to the same level if the actual storage quantity was the same, neglecting whether the storage quantity was increasing or decreasing. Thus, the control was not always effective. Sometimes the storage quantity would fluctuate due to the control. One matter which must be taken into account was a delay time. If the burning power was revised at the shaft furnace, it would take at least 10 minutes for the storage quantity to change. Such a long delay time sometimes put the controlling system out of order. Furthermore, the conventional controlling method took no account of the melt temperature T$_k$ of the holding furnace. Then manual adjustment of burning power was also indispensable to stabilize the melt temperature of the holding furnace, since fluctuation of the melt temperature would exert an undesired influence upon the copper products.

SUMMARY OF THE INVENTION

This invention proposes an automatic controlling device of burners of a shaft furnace in an apparatus including a shaft furnace for melting copper solid into copper melt by a plurality of burners A, B, . . . , and a holding furnace for holding the copper melt exhausted from the shaft furnace, for the purpose of stabilizing storage quantity and melt temperature of the holding furnace, taking an inclination angle of the holding furnace and melt temperature into account as input signals, and assigning opening degrees of valves of air passages to the burners as output signals comprising;

a preprocessor part
 for predetermining relation between the inclination angle of the holding furnace and the storage quantity of copper melt in the holding furnace by a folding-line function,
 for calculating the actual storage quantity from the inclination angle in accordance with the folding-line function,
 for calculating a deviation E of the actual storage quantity H$_k$ from the reference storage quantity H$_\square$,
 for calculating a time change ΔE of the deviation in a sampling time, a Fuzzy Logic part
 for predetermining more than three membership functions from PB (positive big) to NB (negative big) both for the deviation E of the storage quantity and for the time change ΔE of the deviation,
 for predetermining more than three membership functions from PB (positive big) to NB (negative big) for a time change ΔL of burning power
 for predetermining a rule map for determining a preferable time change ΔL of burning power for a set of the deviation E and the time change ΔE,
 for calculating the preferable time change ΔL of burning power by Fuzzy Logic according to the rule map,
 for calculating the burning power of the present sampling time by adding the time change ΔL to the burning power of the last sampling time, and
 for setting the burning power of the first sampling time by predetermining the relation between the storage quantity and the burning power at an initial state by a folding-line function and by determining the initial burning power from the folding-line function, a postprocessor part
 for predetermining a relation between the burning power and the burner air pressure of each zone A, B, . . . by folding-line functions,
 for calculating the air pressure QA, QB, . . . of each zone from the burning power determined by the Fuzzy Logic part according to the folding-line functions.
 for predetermining coefficients for each zone A, B, . . . which change stepwise according to the melt temperature,
 for calculating coefficients KA$_k$, KB$_k$, . . . which shall multiply the air pressure of each zone from the melt temperature at the present sampling time t$_k$,
 for multiplying the air pressures QA$_k$, QB$_k$, . . . of each zone by the coefficients KA$_k$, KB$_k$, . . . calculated in order to obtain the revised air pressures Q'A$_k$, Q'B$_k$, . . . to the controller of the valve as last controlling variables, a hardware part including a controller and a positioner for supplying a valve-adjusting signal to a motor driving a valve in order to give the air pressure of each zone access to the reference air pressures obtained by the postprocessor part.

The steps of logic and calculation of this invention can be summarized in brief as follows;

①  The Fuzzy Logic part predetermines more than three membership functions from NB (negative big) to PB (positive big) regarding the deviation E between the actual storage quantity and the reference storage quantity, the time change $\Delta E$ of the deviation and the burning power L, and determines the preferable change $\Delta L$ of burning power of each zone from the set of the deviation E and the time change $\Delta E$ by the Fuzzy Logic.

②  New burning power L is given by adding the calculated change $\Delta L$ to the current burning power, ③  The calculated burning power L is converted to the air pressure of each zone according to the predetermined relation between the burning power and the air pressure by a folding line function, ④  Coefficients which will change stepwise according to the melt temperature of the holding furnace are predetermined to each zone. The value of the coefficient is determined from the actual melt temperature to revise the air pressure. Final, values of the air pressure of each zone are obtained by multiplying the air pressure calculated ③ by the coefficient.

The features of this invention will now be explained.

(1) This invention controls the burning power by the storage quantity and its time change. Therefore, this invention enables us to keep the actual storage quantity stably at the reference storage quantity without fluctuation in comparison with the conventional control which depends only upon the storage quantity.

(2) There are several difficulties for controlling the burning power in the shaft furnace. One is a long delay from the time when the burning power is changed to the time when some influence appears upon the storage quantity or the melt temperature. Another difficulty is a change of the delay according to the state of material copper solid in the shaft furnace. The other difficulty is the complexity among the state of material copper, exhaust quantity from the shaft furnace, the storage quantity in the holding furnace and the melt temperature. Because of the difficulty of formulating or modeling the relation of steps into a mathematical model, the conventional controlling method, e.g. PID (proportion-integration-differentiation) control which has succeeded in other fields of technology could not be applied to controlling of a shaft furnace. However, Fuzzy Logic can be applied to controlling of it without detailed understanding of the relation of the steps.

(3) This invention makes use of the Fuzzy Logic to control the burning power. Therefore, this invention enables us to control the shaft furnace in a completely automatic manner by signifying the storage quantity, the time change of it and the burning power with membership functions and by determining the preferable burning power automatically from the membership functions of the storage quantity and the time change thereof. This invention realizes a full automatic-controlling of a shaft furnace for the first time.

The advantages of this invention can be summed up as follows, (I) The operators used by this invention are fewer than those of the conventional manual operation and can operate the furnace in an optimum condition by the automatic controlling of the burning power.

(II) High stability of the storage quantity and the temperature of melt heightens the stability of the quality of copper products (III) More frequent adjustment of burning power by the Fuzzy Logic saves us burner fuel in comparison with the manual operation which depends on the skill of the operator.

BRIEF DESCRIPTION OF THE DRAWINGS

FIG. 5 is a controlling map of Fuzzy Logic determining the relation among E, $\Delta E$ and $\Delta L$.

DETAILED DESCRIPTION OF THE EMBODIMENTS

Figure 1:
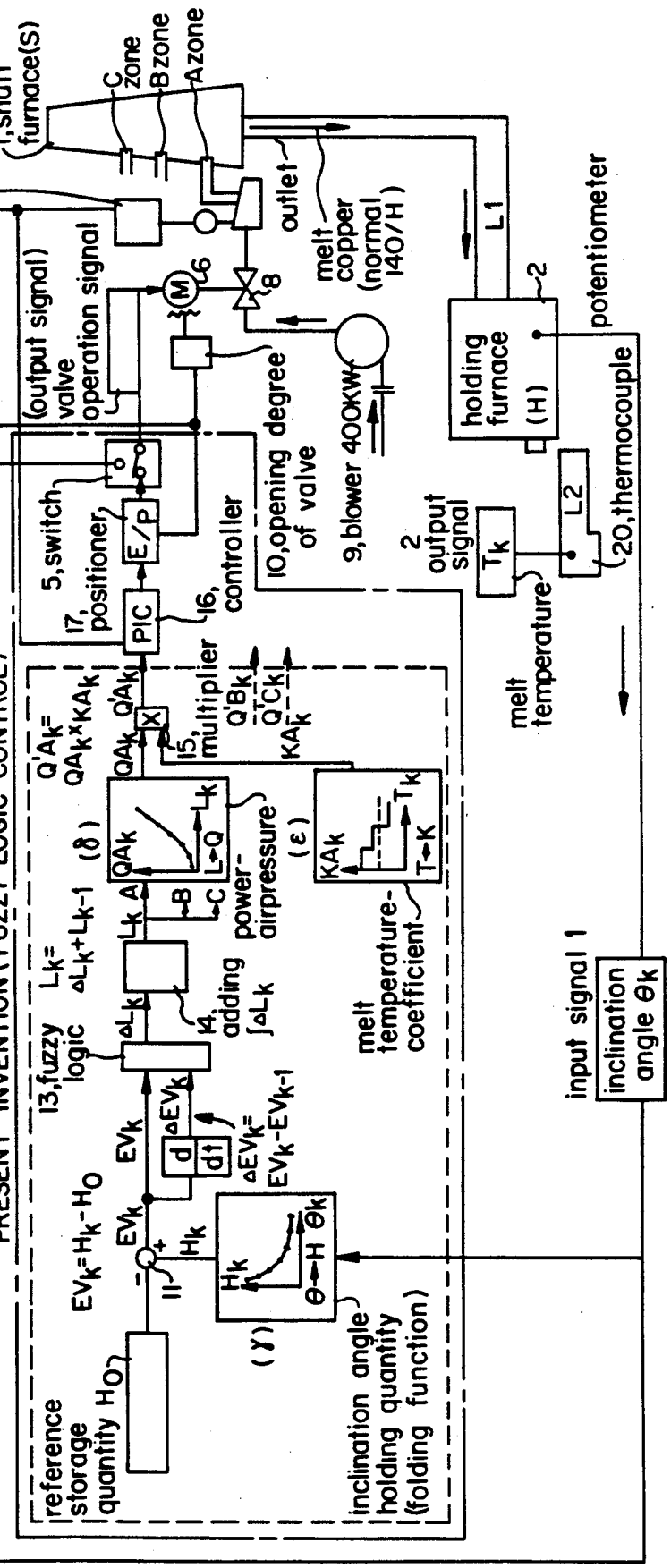
FIG. 1 is a schematic view of a controlling system of a shaft furnace including both the conventional method and the present invention.

The controlling system of the present invention is shown on the middle stage (enclosed by dotted lines) of FIG. 1.

A shaft furnace (1) exhausts copper melt. The copper melt enters a holding furnace (2). The holding furnace (2) is a cylindrical vessel which can rotate around a central axis. The holding furnace (2) has an inlet of copper melt on the rear end. An outlet opening is formed at a spot of the front end which deviates from the center of the front end. The axial rotation angle of the holding furnace around the axis is called inclination angle $\theta$. Since the outlet opening is decentralized, the storage quantity H of copper melt in the holding furnace changes in accordance with the inclination angle $\theta$. The relation between the inclination angle $\theta$ and the storage quantity H is predetermined. The storage quantity H can be calculated from the inclination angle $\theta$.

The copper melt is exhausted from the outlet opening of the holding furnace by rotating it. The exhausted copper melt is fed to a casting process or a pressing process. The speed of the treatment of the processes is kept to be constant. Since the exhausting speed is constant, excess storage quantity H signifies stronger burning power for melting solid copper in the shaft furnace than the optimum one. In this case, the burner air pressure should be decreased in order to weaken the burning power.

On the contrary, too little storage quantity H signifies weaker burning power for melting solid copper in the shaft furnace than the optimum one. In the case the burner air pressure should be increased. The storage quantity H is a first input signal.

This invention will employ the temperature $T_k$ of melt copper in the holding furnace in addition to the storage quantity H as an input signal for controlling the burning power of the shaft furnace. A thermocouple is provided in the holding furnace (2) in order to measure the melt temperature $T_k$. The melt temperature can also be obtained by measuring the temperature of the melt copper just exhausted from the shaft furnace (1). The melt temperature $T_k$ is a second input signal which will complement the first input signal.

The first input signal is the inclination angle $\theta$ which determines the storage quantity H. However, the inclination angle $\theta$ do not correspond to a direct physical parameter. What is important is the storage quantity H. The inclination angle $\theta$ can be converted to the storage quantity H by the inclination-angle-storage quantity conversion shown by graph ($\gamma$).

What this invention aims at is to keep the storage quantity constant. An optimum storage quantity is predetermined as a reference storage quantity $H_\square$ toward which the actual storage quantity shall be controlled. In this embodiment, the maximum storage quantity is 18 t. The reference storage quantity $H_\square$ is determined to be 10 t. However, the reference storage quantity can arbitrarily be determined otherwise.

At every sampling time (e.g. every three minutes), the melt temperature T and the storage quantity H (i.e. inclination angle) will be sampled, although T and H are always measured. The preferable burner air pressure will be determined by the sample T and H. Therefore, a suffix k which designates the time of sampling will sometimes be affixed to the parameters T and H. However, suffix k will sometimes be neglected for the sake of simplicity. The parameters T and H with the suffix k or without it signify the same parameters since now.

A subtraction operation (11) makes a deviation $EV_k$ of the storage quantity by subtracting the reference storage quantity $H_\square$ from the actual storage quantity $H_k$. Namely, $$EV_k = H_k - H_\square \quad (1)$$

Second, a differential operation (12) makes a time change $\Delta EV_k$ of the deviation $EV_k$ of the storage quantity by subtracting the (k−1)-th deviation $EV_{k-1}$ from the K-th deviation $EV_k$. Namely, $$\begin{aligned} \Delta EV_k &= EV_k - EV_{k-1} & (2) \\ &= H_k - H_{k-1} & (3) \end{aligned}$$

This invention will calculate a preferable change $\Delta L$ of burning power according to the teaching of Fuzzy Logic by employing the deviation EV of the storage quantity and its time change $\Delta EV$ as input signals. Although the melt temperature T is newly employed, this invention does not employ T as a parameter for Fuzzy Logic.

The deviation of the storage quantity will be sometimes written as $EV_k$ affixed with the time suffix k. In brief, it is sometimes written as EV. More simplified expression E will also be employed therefor.

Figure 2:
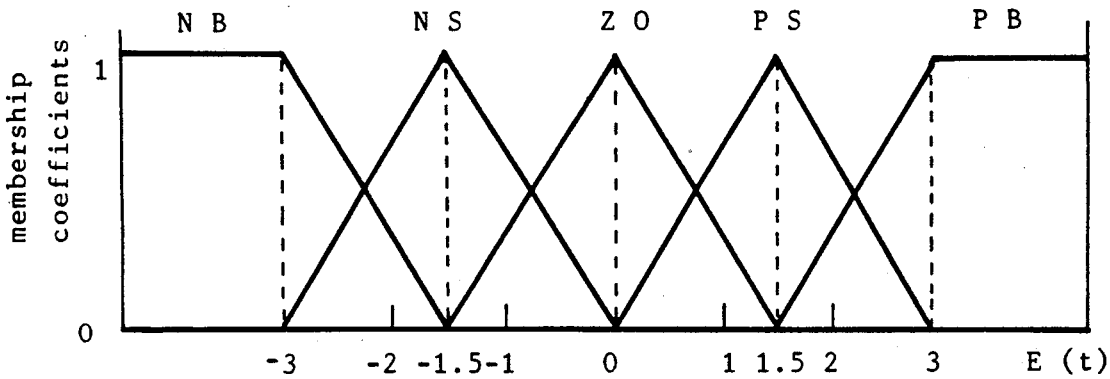
FIG. 2 is a graph showing an example of a membership function of the deviation E of the storage quantity.
Figure 3:
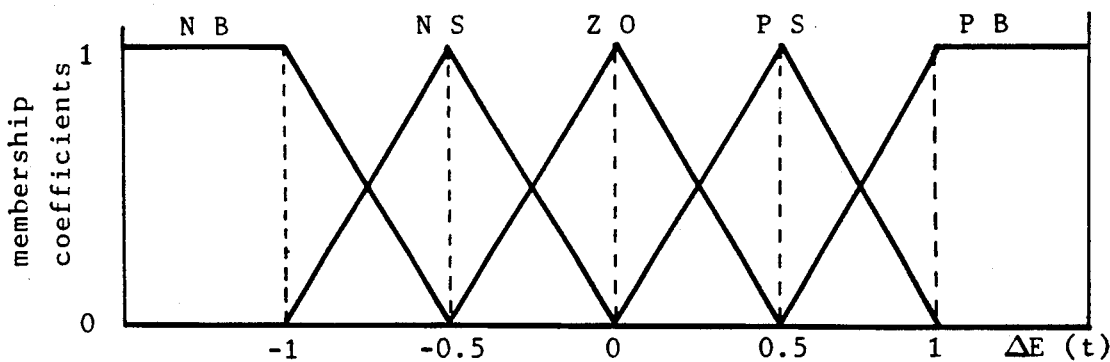
FIG. 3 is a graph showing an example of a membership function of the time change $\Delta E$ of the deviation of the storage quantity.
Figure 4:
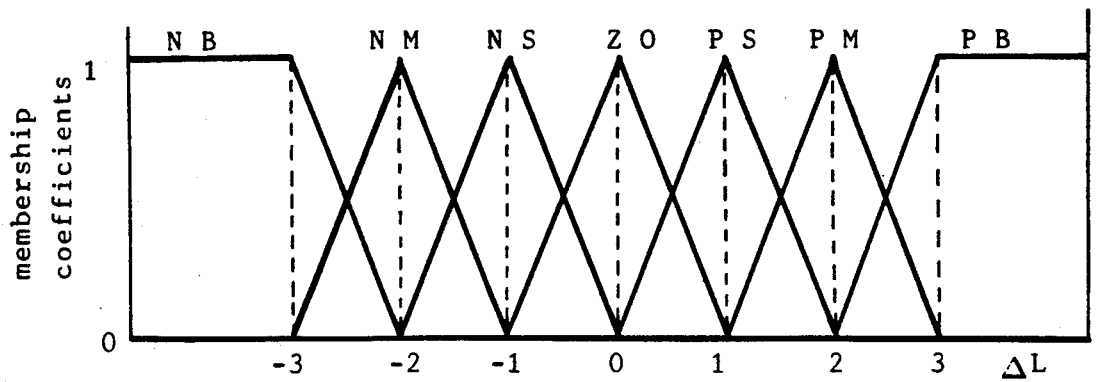
FIG. 4 is a graph showing an example of a membership function of the time change $\Delta L$ of burning power.

Similarly, the time change of the deviation will be written as $\Delta EV_k$, $\Delta EV$ or $\Delta E$. They all are equivalent A Fuzzy logic part (13) establishes e.g. five membership functions from PB (positive big) to NB (negative big) for the deviation E of the storage quantity and the time change $\Delta E$. FIG. 2 shows five membership functions NB, NS, ZO, PS and PB of the deviation E. NB means "negative big". NS means "negative small". ZO means "zero". PS means "positive small". PB means "positive big". FIG. 3 shows five similar membership functions of the time change $\Delta E$.

The abscissas of the graphs denote E and $\Delta E$ in the unit of ton. The ordinates denote the membership functions whose values range from 0 to 1.

The number of the membership functions should be more than three. This example employs five membership functions both for E and $\Delta E$. The shape of membership functions may be either trapezoid or triangular. This embodiment adopts triangular membership functions for NS, ZO and PS and trapezoid membership functions for NB and PB. They overlap with half of neighboring membership functions.

The middle membership function ZO has a triangle shape with a peak point at 0 and end points at −1.5 and +1.5. Namely, ZO is 0 in the region $E \leq -1.5$, and in the region $E \geq +1.5$. ZO is defined to be $2E/3 + 1$ in the region of $-1.5 \leq E \leq 0$. ZO is $-2E/3 + 1$ in the region of $0 < E \leq 1.5$.

The positive small membership function PS is a function which will be reproduced by transferring ZO by 1.5 t to the right. The negative small membership function NS is a function which will be reproduced by transferring ZO by 1.5 T to the left. The membership function PB (positive big) is half trapezoid. PB is 0 in the region $E \leq 1.5$. It is defined to be $2E/3 - 1$ in the region $1.5 \leq E \leq 3$ and 1 in the region $3 < E$. The last membership function NB (negative big) is 1 in the region $E < -3$, $-2E/3 - 1$ in the region $-3 \leq E < -1.5$ and 0 in the region $-1.5 \leq E$.

The shape of the membership functions can be arbitrarily changed from the most simple shapes shown in FIG. 2 or FIG. 3.

The membership functions of $\Delta E$ are defined in a similar manner. However, the unit of the abscissa is ton/sampling time (i.e. ton/3 minutes in the embodiment). $\Delta E$ is also expressed by five membership functions NB, NS, ZO, PS and PB. NS, ZO and PS are triangle functions. NB and PB are half trapezoid functions.

The time change $\Delta L$ of burning power is the output of Fuzzy Logic. The output signal $\Delta L$ is expressed by seven membership functions; NB (negative big), NM (negative middle), NS (negative small), ZO (zero), PS (positive small), PM (positive middle) and PB (positive big). The number of the membership functions may be 3, 7 or so instead of 5. The membership functions should be either triangular or trapezoid. This embodiment employs triangle functions which overlap by half with the neighboring ones.

The membership function for the time change $\Delta L$ is selected by the set of the membership functions of the deviation E and of the time change $\Delta E$. The selection depends on a Fuzzy rule consisting of the sets of preconditions (IF) and the postconditions (THEN). The Fuzzy rule is not rigorously determined. Man can establish a pertinent Fuzzy rule by himself. An example of a Fuzzy rule is expressed in a rule map shown in FIG. 5.

The input signals E and $\Delta E$ have five membership functions. Thus, 25 preconditions are generated from the products ($5 \times 5 = 25$) of the membership functions of E and $\Delta E$. Accordingly, at most 25 Fuzzy rules can be produced.

FIG. 5 exhibits the membership functions of ΔE in the uppermost line and the membership functions of E in the leftest column. Other 5×5 partial matrix exhibits the membership functions of ΔL. Two membership functions E and ΔE lead to the membership function of ΔL at the crosspoint of the column of ΔE and the line of E.

For example, if E is NB (first precondition) and ΔE is NB (second precondition), then ΔL shall be PB (post condition) from the rule map. This means a Fuzzy rule that if E is negative big and ΔE is negative big, then ΔL shall be positive big (increase ΔL by a big amount). Namely, "if the actual storage quantity H is far less than $H_\square$ and the actual storage quantity H is rapidly decreasing, then heighten the burning power very quickly". This safely corresponds with the judgement of an operator who operates the shaft furnace by manual operation.

For example, if E is PB (positive big; first condition) and ΔE is PB (positive big; second condition), then ΔL shall be NB (postcondition; at the rightest, lowest corner). This Fuzzy rule is entirely inverse to the former example. The Fuzzy rule says, "if the actual storage quantity H is far more than the reference storage quantity $H_\square$ and the storage quantity H is rapidly increasing, then lower the burning power very quickly."

In general, when either E or ΔE is positive, the burning power shall be lowered, because $E>0$ or $\Delta E>0$ means excess storage quantity or increasing tendency of it. On the contrary, when either E or ΔE is negative, the burning power shall be heightened, because $E<0$ or $\Delta E<0$ means shortage of storage quantity or decreasing tendency of it. In mixed states, e.g. $E<0$ and $\Delta E>0$ or $E>0$ and $\Delta E<0$, ΔL shall be determined to compensate bigger deviation of E and ΔE. For example, if E is NB and ΔE is PB (at the rightest, highest corner), then ΔL shall be ZO. This Fuzzy rule says, "if the actual storage quantity H is far more than $H_\square$ and it is rapidly increasing, then keep the burning power as it is".

Therefore, in general, the same membership functions are aligned in a right-hand-upward slanting line. Membership functions which change from "positive" to "negative" are aligned along a left-hand-upward slanting line.

Therefore, there is a possibility for making 25 (=5×5) Fuzzy rules. However, all 25 rules must not be adopted as actual Fuzzy rules. Some of them are unnecessary.

Figure 6:
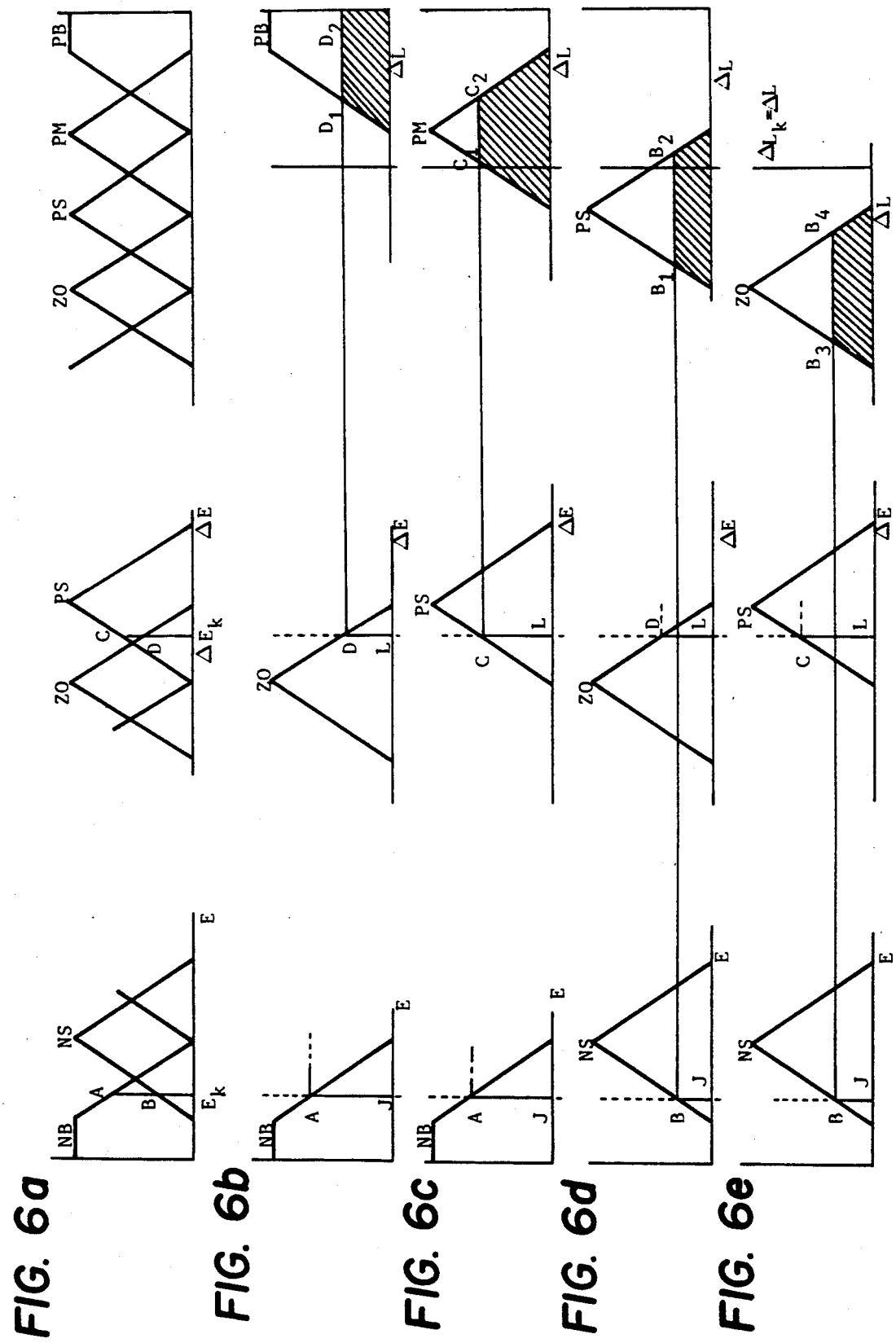
FIG. 6 is membership functions for determining the time change $\Delta L$ of the burning power by the Fuzzy Logic from the present values $E_k$ and $\Delta E_k$ of E and $\Delta E$.

FIG. 6 demonstrates the Fuzzy Logic of which this invention will make use. The left column shows the membership functions of E. The middle column exhibits the membership functions of ΔE. The right column shows the membership functions of ΔL. The figures show only parts of the membership functions which are required to explain the Fuzzy Logic in exemplary way.

At the K-th sampling time, E is assumed to be $E_k$ in the graph of membership functions of E, and ΔE is assumed to be $\Delta E_k$ in the graph of ΔE (in the middle column). In the example, E has two non-zero membership functions NB and NS for the value $E_k$ (ZO, PS and PB are zero for $E_k$).

Similarly, ΔE has two non-zero membership functions ZO and PS for the value $\Delta E_k$ (NB, NS and PB are zero for $\Delta E_k$).

The vertical line $E=E_k$ crosses the membership functions NB and NS of E at points A and B respectively. The vertical line $\Delta E=\Delta E_k$ crosses the membership functions PS and ZO of ΔE at points C and D respectively.

The membership functions NB (negative big) and NS (negative small) are pertinent to E. The membership functions ZO (zero) and PS (positive small) are pertinent to ΔE. Therefore, the time change ΔL will be determined by considering four relationships between the membership functions of E, ΔE and ΔL.

where the first terms and the second terms in the brackets are membership functions of E and ΔE respectively. The terms directed by arrows are membership functions of ΔL which derive from the set of the membership functions of E and ΔE enclosed by the brackets.

FIG. 6(a) shows all pertinent membership functions. FIG. 6(b) to FIG. 6(e) show the first to fourth relationship. FIG. 6(b) exhibits the relation (NB, ZO)→PB. Namely, the deviation E of storage quantity adopts NB. The time change ΔE adopts ZO and the time change ΔL of burning power adopts PB. The relationship corresponds to the Fuzzy rule " if the deviation E is negatively big and the time change ΔE is nearly zero, then increase the burning power at a quick rate (positive big).

The membership coefficient of NB for E is the height AJ in the right figure of FIG. 6(b). The membership coefficient of ZO for ΔE is the height DL in the middle figure of FIG. 6(b). Fuzzy Logic adopts a lower value of two membership coefficients AJ and DL as the height of the membership function PB of ΔL. As DL is smaller than AJ, a horizontal line whose height is DL is drawn to the membership function PB of ΔL. The line crosses PB of ΔL at $D_1$. The contribution of PB to the ΔL is shown by the hatched trapezoid below the line $D_1 D_2$.

Similarly, FIG. 6(c) shows the relationship (NB, PS)→PM. Namely, NB of E and PS of ΔE determine the contribution of PM of ΔL. The vertical line $E=E_k$ crosses NB of E at point A. The height AJ is a membership coefficient of NB of E. The vertical line $\Delta E=\Delta E_k$ crosses PS of ΔE at point C. The height CL is a membership coefficient of PS of ΔE for $\Delta E_k$. Since Fuzzy Logic adopts a lower value of membership coefficients, CL (<AJ) shall be adopted. A horizontal line with the height of CL is drawn to PM of ΔL. PM of ΔL is a triangle function. The line crosses PM at points $C_1$ and $C_2$. The contribution of PM to ΔL comes from the hatched trapezoid below the line $C_1 C_2$. The relationship (NB, PS)→PM means the Fuzzy rule "If the deviate of storage quantity is negatively big (severe shortage) and the time change of it is positively small, then increase the burning power at a moderate rate.

FIG. 6(d) shows the third relation (NS, ZO)→PS. It adopts NS for E, ZO for ΔE and PS for ΔL as membership functions. NS is a triangle function. The vertical line $E=E_k$ crosses at a point B. The height BJ is a membership coefficient NS of E. ZO of ΔE is also a triangle function. The vertical line $\Delta E=\Delta E_k$ crosses ZO at a point D. The height DL is a membership coefficient ZO of ΔE. In the example, BJ<DL. Since the Fuzzy Logic adopts the minimum membership coefficient, a horizontal line whose height is BJ is drawn into PS of ΔE. The horizontal line crosses PS of ΔL at points B₁ and B₂. The trapezoid below the line B₁ B₂ is the contribution of PS to ΔL. The relationship (NS, ZO)→PS signifies the Fuzzy rule, "If the deviation E of storage quantity is negatively small and the time change ΔE is zero, then increase ΔL at a slow rate (positive small)".

FIG. 6(e) corresponds to the fourth relationship (NS, PS)→ZO. The relationship adopts NS for E, PS for ΔE and ZO for ΔL as membership functions. The Fuzzy rule of the relation says, "If the deviation E of storage quantity is negatively small and the time change ΔE is positively small, then keep the burning power ΔL at a constant level". The vertical line $E=E_k$ crosses NS at point B. The height BJ is the membership coefficient of NS of E. The vertical line $\Delta E = \Delta E_k$ crosses PS at point C. The height CL is the membership coefficient of PS of ΔE. Since BJ<CL, BJ is adopted as the height of the membership function of ZO of ΔL. The horizontal line whose height is BJ crosses ZO at points B₃ and B₄. The hatched trapezoid below the line B₃ B₄ is the contribution of ZO to ΔL.

Thus four different Fuzzy rules give four contributions of the membership functions PB, PM, PS and ZO to the line change ΔL. Other membership functions NB, NM and NS give no contribution to ΔL for the present values $E_k$ and $\Delta E_k$. The membership functions which have hatched trapezoids shall be taken into account in proportion to the areas of hatched trapezoids for determining the time change ΔL.

Therefore, a gravity center of four trapezoids shall be calculated. The gravity center shall be assigned to be the time change $\Delta L_k$. The gravity center (or average of ΔL) is defined, in general as, $$\Delta L_k = \frac{\sum_i \int \Delta L F_i(\Delta L) d(\Delta L)}{\sum_i \int F_i(\Delta L) d(\Delta L)}$$

where the integration d(ΔL) shall be done with regard to all hatched trapezoids of the membership functions which have non-zero contribution to ΔL, the summation shall be done with regard to all contributions of the hatched trapezoids and $F_i(\Delta L)$ is the function of the trapezoids of the i-th membership function. Equivalent expression of $\Delta L_k$ can be written as, $$\Delta L_k = \frac{\Sigma \Delta L_{gi} S_i}{\Sigma S_i}$$

where i means the number of membership functions, $S_i$ is the area of hatched trapezoids of the i-th membership function. $\Delta L_{gi}$ is the gravity center or average of the i-th trapezoid.

$$\Delta L_{gi} = \frac{\int \Delta L F_i(\Delta L) d(\Delta L)}{\int F_i(\Delta L) d(\Delta L)}$$

The triangle membership functions like PM, PS, ZO, NS and NM have a constant gravity center irrespective of the height of the membership coefficient (the height of trapezoid). The gravity center is the value of ΔL at the peak of the membership function. However, the half trapezoid membership functions like PB and NB have varying gravity center which depends upon the height of the hatched area.

Thus, the time change $\Delta L_k$ of burning power is calculated. The present burning power $L_k$ is easily obtained by adding the time change $\Delta L_k$ to the last burning power $L_{k-1}$.

$$L_k = L_{k-1} + \Delta L_k = \Sigma \Delta L \tag{4}$$

The burning power shall be automatically adjusted to the newly-calculated level $L_k$ by controlling the air pressure of burner.

The above-mentioned procedure can be generated of course. $E_k$ and $\Delta E_k$ can take any positive or negative values. For any $E_k$ and $\Delta E_k$, membership functions which are non-zero for $E_k$ and $\Delta E_k$ shall be selected. All sets of membership functions of E and ΔE shall be made. First, the minimum operation which determines the minimum membership coefficient of E or ΔE cuts an upper part of the membership function of ΔL and makes a trapezoid which contributes to the determination of ΔL. Second, $\Delta L_k$ shall be obtained by calculating the gravity center (or an average of ΔL) of all trapezoids.

The sampling time of sampling of E or ΔE and calculation of ΔL is e.g. three minutes.

A preferable relation of an initial burning power $L_1$ to an initial storage quantity $H_1$ should be established as a folding line function by some empirical method. The initial burning power $L_1$ is determined by the initial storage quantity $H_1$ from the folding line function.

The second burning power $L_2$ can be calculated from $E_1$, $\Delta E_1$ and $L_1$ by the Fuzzy Logic of this invention. The k-th burning power $L_k$ can be calculated from $E_{k-1}$, $\Delta E_{k-1}$ and $L_{k-1}$. Therefore, the k-th burning power $L_k$ at the k-th sampling time is obtained in succession.

These operations should be commonly done with regard to every burner A, B or C. Then, the burning power will be converted to the air pressure of each burner zone A, B and C. The burning-power-air-pressure conversion should in advance be establish into a holding line function as shown by the graph (δ) in FIG. 1. Since the air pressure should be in proportion to the burning power, the function of the burning-power-air-pressure conversion is safely shown by a right-hand-upward line (monotonously increasing function).

However, the preferable air pressures $QA_k$, $QB_k$ and $QC_k$ of the burner zones A, B and C shall be differently determined from the same $L_k$, because the influence of the air pressure of each zone to the burning power is different owing to the geometric difference of the zones in the shaft furnace.

Figure 7:
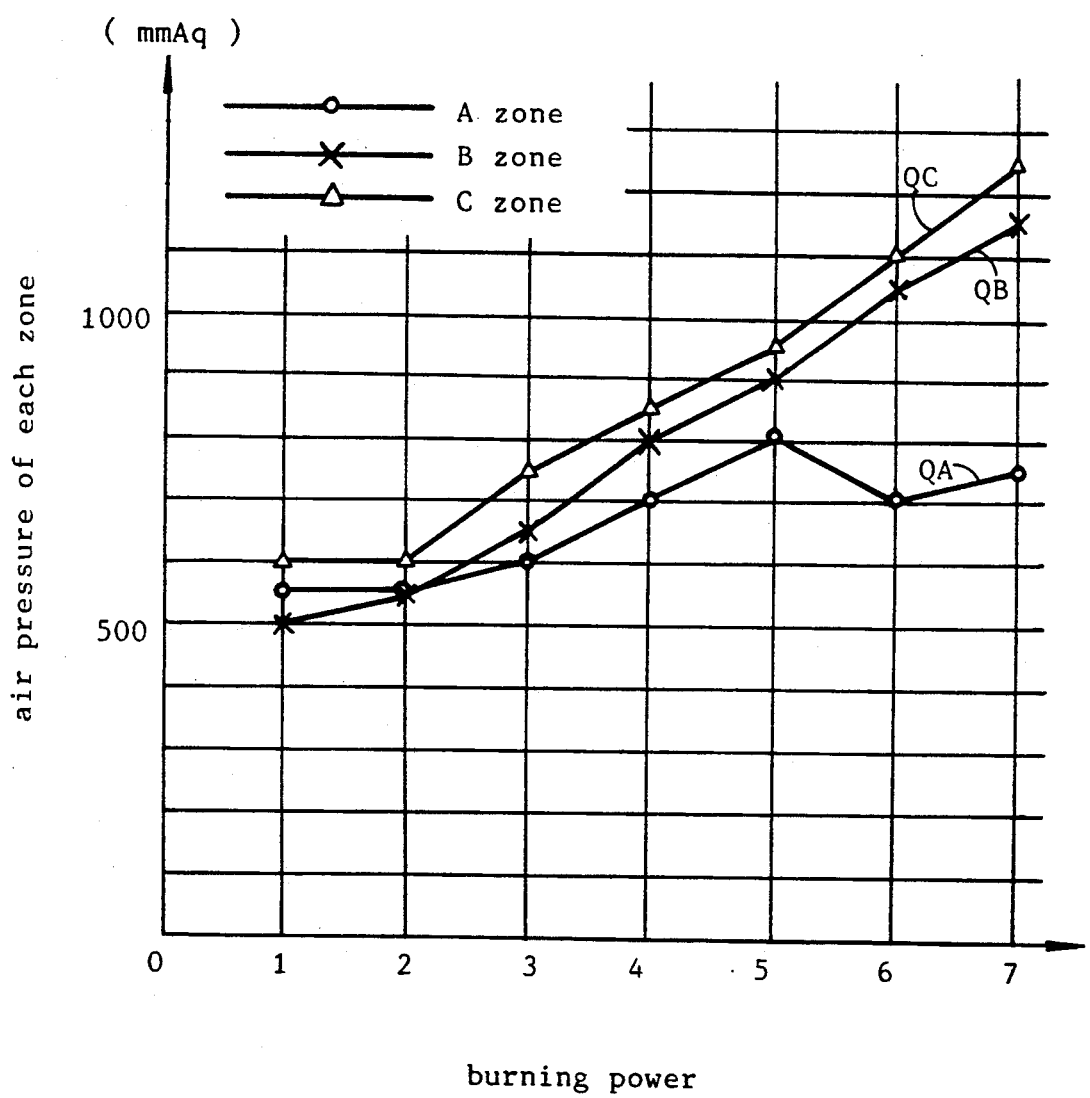
FIG. 7 is a graph showing the predetermined relation between the burning power L and the air pressure of each burner zone.

FIG. 7 shows an example of the relations between the air pressure of the zones A, B and C, and the burning power. The abscissa denotes the burning power which is divided into seven steps. The ordinate denotes the air pressure (in an unit of mmAq) of each zone. In the example, preferable air pressures $Q_B$ and $Q_C$ of the zones B and C are linearly proportionate to the burning power. However, $Q_A$ decreases at the transition from level 5 to level 6 of the burning power.

TABLE 1

| RELATION BETWEEN BURNER POWER AND AIR PRESSURE (mmAq) | | | |
|---|---|---|---|
| LEVEL | A | B | C |
| 1 | 550 | 500 | 600 |
| 2 | 550 | 550 | 600 |
| 3 | 600 | 650 | 750 |
| 4 | 700 | 800 | 850 |

TABLE 1-continued
RELATION BETWEEN BURNER POWER AND AIR PRESSURE
(mmAq)

| LEVEL | A | B | C |
|---|---|---|---|
| 5 | 800 | 900 | 950 |
| 6 | 700 | 1050 | 1100 |
| 7 | 750 | 1150 | 1250 |

The same relations between the air pressure and the burning power are also written in Table 1. The first column is the level of the burning power, the second column is the preferable air pressure (mmAq) in the zone A, the third column is the preferable air pressure in the zone B and the fourth column is the preferable air pressure in the zone C. The graph (δ) consisting of holding time functions can be obtained from Table 1.

Preferable air pressure of the zones A, B and C shall be obtained by multiplying the burning power by different coefficients. This is one of the features of this invention. Therefore, air pressures of the zones are not proportionate to each other.

Another feature of this invention is to amend the determined air pressures QA QB and QC by taking account of the melt temperature $T_k$. For this amendment, a coefficient conversion shown in graph (ε) of FIG. 1 shall be done. This coefficient conversion converts the melt temperature $T_k$ into the multipliers KA, KB and KC of the zones A, B and C. This conversion is also different with regard to the zones. The multipliers KA, KB and KC will produce amended preferable air pressures Q'A, Q'B and Q'C by multiplying QA, QB and QC by themselves. The multipliers $K_A$, $K_B$ and $K_C$ are different from each other. The amended air pressure are;

$$Q'A_k = QA_k \times KA_k \quad (5)$$

$$Q'B_k = QB_k \times KB_k \quad (6)$$

$$Q'C_k = QC_k \times KC_k \quad (7)$$

Figure 8:
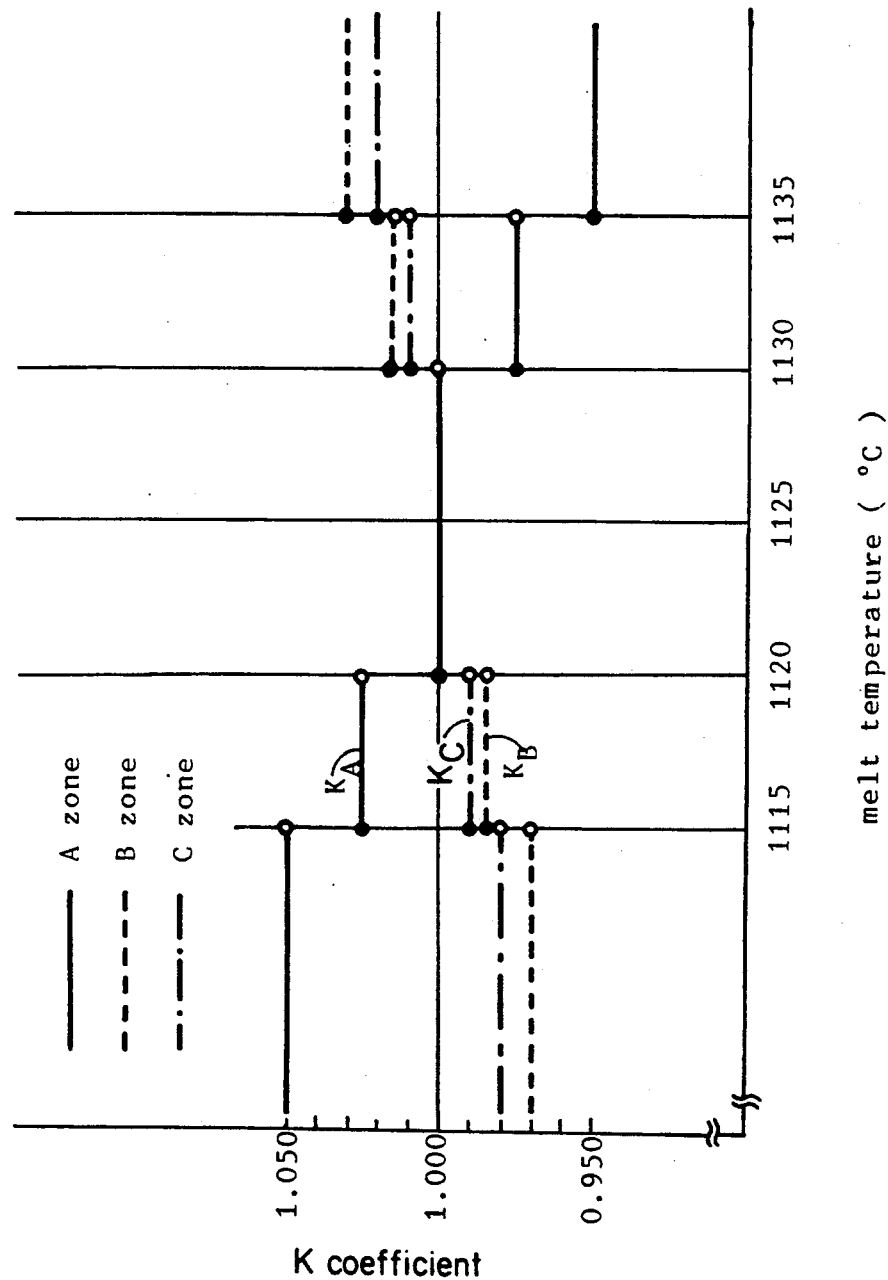
FIG. 8 is a graph showing the predetermined relation of the melt temperature T to the zone coefficients KA, KB and KC.

FIG. 8 shows the coefficients $KA_k$, $KB_k$ and $KC_k$ as functions of the melt temperature $T_k$. The melt temperature is divided to several regions with a fine degree width. Every coefficient KA, KB or KC has one value at the divided region. The solid lines show KA; coefficient of the zone A. The broken lines show KB; coefficient of the zone B. The dotted lines show KC; coefficient of the zone C. The coefficients are values which has small deviation from 1. All coefficients are 1 between 1120° C. and 1130° C. of the melt temperature. However, they deviate a little from 1 in other temperature regions. Finer adjustment will be accomplished by multiplying QA, QB and QC by KA, KB and KC. The same matter is shown in Table 2.

TABLE 2
RELATION BETWEEN MELT TEMPERATURE AND COEFFICIENTS

| MELT TEMPERATURE (°C.) | COEFFICIENTS OF ZONES A, B AND C | | |
|---|---|---|---|
| | KA | KB | KC |
| ~1115 | 1.050 | 0.970 | 0.980 |
| 1115~1120 | 1.025 | 0.985 | 0.990 |
| 1120~1125 | 1.000 | 1.000 | 1.000 |
| 1125~1130 | 1.000 | 1.000 | 1.000 |
| 1130~1135 | 0.975 | 1.015 | 1.010 |
| 1135~ | 0.950 | 1.030 | 1.020 |

The most preferable melt temperature is 1125° C. Therefore, coefficients are normalized to be 1 in the vicinity of T=1125° C.

The coefficients are normalized by the restriction such as the average should always be 1. Namely, their sum is always 3. Total burning power has still been determined by the previously calculated $L_k$. These coefficients will finely readjust the vertical distribution of burning power in the shaft furnace.

In this example, when the melt temperature $T_k$ is lower, the burning power of the lowest zone A shall be raised in order to heighten the melt temperature. On the contrary, when the melt temperature $T_k$ is higher, the burning power of the lowest zone A shall be weakened in order to lower the melt temperature. The fine adjustment depends on the intuitive idea that the lowest burner A has the most important role for determining the melt temperature, because the melt has passed the zone A at last.

However, this choice of the coefficients has derived only from intuitive, primitive causality. The choice may not always valid. Since the burning power ΔL is determined by the deviation E of storage quantity and the time change ΔE, some cases may require the coefficients KA, KB and KC which have reverse tendency with the melt temperature to the present example. In any cases, the choice of KA, KB and KC to $T_k$ should be arbitrarily changed with the restriction KA+KB+KC=3.

A multiplying operation (15) calculates amended air pressures Q'$A_k$, Q'$B_k$ and Q'$C_k$ by multiplying Q$A_k$, Q$B_k$ and Q$C_k$ by KA, KB and KC.

Since final preferable air pressures Q'$A_k$, Q'$B_k$ and Q'$C_k$ are obtained, these values will be supplied to three controllers (16). The following steps are quite similar to the conventional, manual operation. The air pressure signals Q'$A_k$, Q'$B_k$ and Q'$C_k$ will be transferred to positioners (17) and switches (5) and become valve operation signals (7). The valve operation signals (7) adjust the opening degree of a valve (8) by rotating a motor (6). Air is supplied from blowers (9) to the burner zones A, B and C. The valves (8) are provided to the passages of air from the blowers (9) and the zones. The amounts of air supplied to the zones A, B and C are determined by the opening degrees of the valves which are in proportion to Q'$A_k$, Q'$B_k$ and Q'$C_k$.

FIG. 1 shows the prior art by the upper part and the present invention by the middle part. Switches (5) can convert the control of furnace from the manual operation to the present invention, and vice versa.

With the common reference storage quantity of 10 ton, two operation methods have been compared. The conventional, manual operation can control the shaft furnace with the average storage quantity of 9.96 ton and with the standard deviation of 1.39 ton. This invention can control the shaft furnace with the average storage quantity of 9.97 ton and with the standard deviation of 0.88 ton. The average storage quantity <H> is defined by, $$<H> = \frac{\int H dt}{\int dt} = \frac{\sum_i H_i}{\sum_i 1}$$

and the standard deviation $\sigma$ is defined by, $$<\sigma> = \left\{ \frac{\int (H - <H>)^2 dt}{\int dt} \right\}^{\frac{1}{2}}$$

$$= \left\{ \frac{\sum_i (H_i - <H>)^2}{\sum_i 1} \right\}^{\frac{1}{2}}$$

Figure 9:
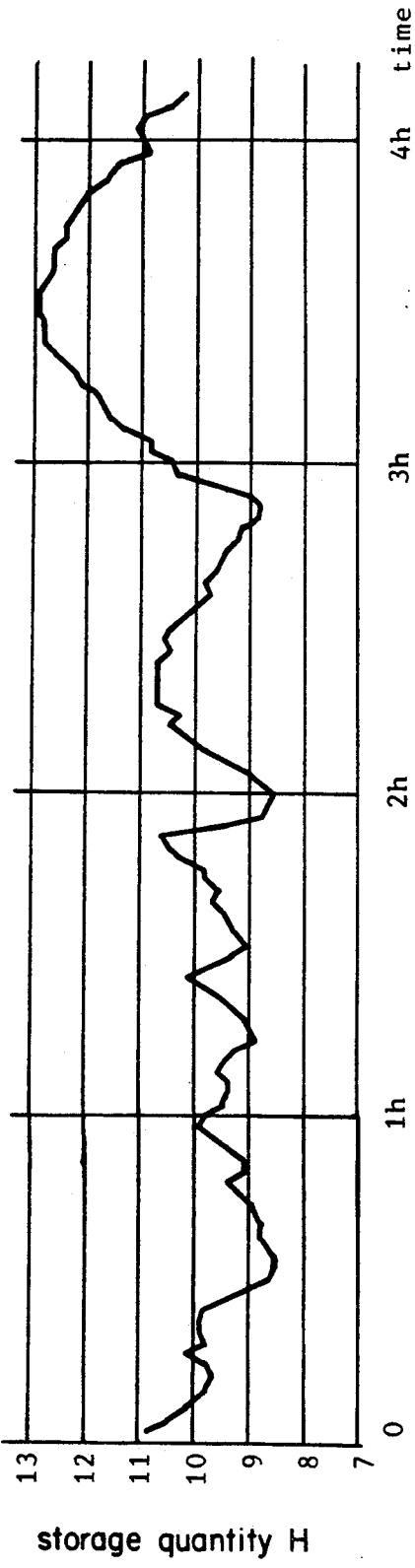
FIG. 9 is a graph of an example of time change of the storage quantity controlled by the conventional, manual operation which depends only on the present storage quantity H.
Figure 10:
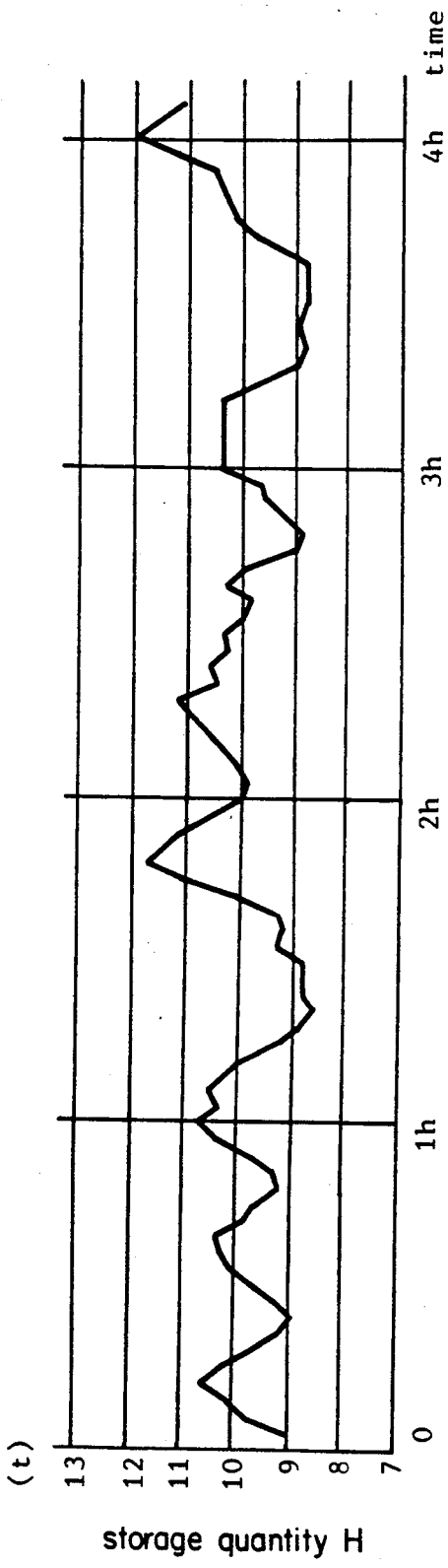
FIG. 10 is a graph of an example of time change of the storage quantity controlled by the present invention which makes use of Fuzzy Logic employing E and $\Delta E$ as parameters.

In order to demonstrate the stability of the storage quantity, the time fluctuation of it in the manual operation is shown in FIG. 9, and the time fluctuation in the improved operation of this invention is shown in FIG. 10. The abscissa is time. The ordinate is storage quantity. These results exhibit bigger fluctuation of the manual operation than that of the improved operation.

What we claim is:

1. An automatic controlling device of burners of a shaft furnace in an apparatus including a shaft furnace for melting copper solid into copper melt by a plurality of burners A, B ..., and a holding furnace for holding the copper melt exhausted from the shaft furnace, for the purpose of stabilizing storage quantity and melt temperature of the holding furnace, taking an inclination angle of the holding furnace and melt temperature into account as input signals, and assigning opening degrees of valves of air passages to the burners as output signals, comprising:

a preprocessor part
  for predetermining relation between the inclination angle of the holding furnace and the storage quantity of copper melt in the holding furnace by a folding-line function,
  for calculating actual storage quantity from the inclination angle in accordance with the folding-line function,
  for calculating a deviation E of the actual storage quantity $H_k$ from the reference storage quantity $H_□$,
  for calculating a time change $\Delta E$ of the deviation in a sampling time,
a Fuzzy Logic part
  for predetermining more than three membership functions from PB (positive big) to NB (negative big) for both the deviation E of the storage quantity and for the time change $\Delta E$ of the deviation,
  for predetermining more than three membership functions from PB (positive big) to NB (negative big) for a time change $\Delta L$ of burning power
  for predetermining a rule map for determining a preferable time change $\Delta L$ of burner power for a set of the deviation E and the time change $\Delta E$,
  for calculating the preferable time change $\Delta L$ of burning power by Fuzzy Logic according to the rule map,
  for calculating the burning power of the present sampling time by adding the time change $\Delta L$ to the burning power of the last sampling time, and
  for setting the burning power of the first sampling time by predetermining the relation between the storage quantity and the burning power at an initial state by a folding-line function and by determining the initial burning power from the folding-line function,
a postprocessor part
  for predetermining a relation between the burning power L and the burner air pressure of each zone A, B, ... by folding-line functions,
  for calculating air pressures $Q_A$, $Q_B$, ... of each zone from the burning power determined by the Fuzzy Logic part according to the folding-line functions
  for predetermining coefficients for each zone A, B, ... which change stepwise according to the melt temperature,
  for predetermining coefficients $KA_k$, $KB_k$, ... which shall multiply the air pressure of each zone, as functions of the melt temperature,
  for calculating coefficients $KA_k$, $KB_k$, ... which shall multiply the air pressure of each zone from the melt temperature at the present sampling time $t_k$,
  for multiplying the air pressures $QA_k$, $QB_k$, ... of each zone by the coefficients $KA_k$, $KB_k$, ... calculated in order to obtain the revised air pressure $Q'A_k$, $Q'B_k$, ... of each zone, and
  for supplying the air pressures $Q'A_k$, $Q'B_k$, ... to controllers of valves as last controlling variables,
a hardware part including a controller and a positioner for supplying a valve-adjusting signal to a motor for driving a valve in order to give the air pressures of each zone access to the reference air pressures obtained by the postprocessor part.

* * * * *